(12) United States Patent
Kripp et al.

(10) Patent No.: US 10,827,316 B1
(45) Date of Patent: Nov. 3, 2020

(54) COMMUNICATIONS SYSTEM HAVING MOBILE WIRELESS COMMUNICATIONS DEVICES OPERATIVE IN PUSH-TO-TALK MODE WORKGROUP AND HANDS-FREE MODE WORK SUBGROUPS AND ASSOCIATED METHODS

(71) Applicant: EAGLE TECHNOLOGY, LLC, Melbourne, FL (US)

(72) Inventors: Keith J. Kripp, Pittsford, NY (US); Andrew R. Thornton, Rochester, NY (US); Colin F. Funai, Lincolnwood, IL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 0 days.

(21) Appl. No.: 16/520,610

(22) Filed: Jul. 24, 2019

(51) Int. Cl.
| | | |
|---|---|---|
| *H04W 4/10* | (2009.01) | |
| *H04W 12/00* | (2009.01) | |
| *H04M 1/60* | (2006.01) | |
| *H04W 4/08* | (2009.01) | |

(52) U.S. Cl.
CPC ........... *H04W 4/10* (2013.01); *H04M 1/6058* (2013.01); *H04W 4/08* (2013.01); *H04W 12/003* (2019.01)

(58) Field of Classification Search
CPC ........ H04W 4/08; H04W 12/003; H04W 4/10
See application file for complete search history.

(56) References Cited

U.S. PATENT DOCUMENTS

| 5,404,577 A * | 4/1995 | Zuckerman | A42B 3/30 |
| | | | 455/351 |
| 10,276,031 B1 * | 4/2019 | Ho | G08B 21/0423 |
| 2006/0253281 A1 * | 11/2006 | Letzt | G10L 15/30 |
| | | | 704/231 |
| 2008/0214238 A1 * | 9/2008 | Rokusek | H04B 1/034 |
| | | | 455/557 |
| 2013/0093589 A1 * | 4/2013 | Hsiao | G08B 1/08 |
| | | | 340/539.13 |

(Continued)

OTHER PUBLICATIONS

"3M—Epic 3 Radio Direct Interface (RDI) Voice Amplifier," retrieved May 2019 from https://www.3mscott.com/products/epic3rdi/, pp. 1-7.

(Continued)

*Primary Examiner* — Keith Ferguson
(74) *Attorney, Agent, or Firm* — Allen, Dyer, Doppelt + Gilchrist, P.A.

(57) ABSTRACT

A communications system may include a command communications device and mobile wireless communications devices responsive to the command communications device to be assigned into a push-to-talk mode workgroup and with subsets of the mobile wireless communications devices also to be assigned to respective different hands-free mode work subgroups. Each mobile wireless communications device may include a portable housing, at least one wireless transceiver carried by the portable housing operable in the push-to-talk mode and the hands-free mode, and a controller carried by the portable housing, coupled to the at least one wireless transceiver, and responsive to the command communications device to operate in the assigned push-to-talk mode workgroup and the assigned hands-free mode work subgroup.

22 Claims, 3 Drawing Sheets

(56) References Cited

U.S. PATENT DOCUMENTS

| | | | | |
|---|---|---|---|---|
| 2013/0231100 A1* | 9/2013 | Sharma | ............... | H04W 4/10 |
| | | | | 455/418 |
| 2017/0302340 A1* | 10/2017 | Berlin | ............... | H04W 4/80 |
| 2019/0187889 A1* | 6/2019 | Moon | ............... | G06F 3/0416 |

OTHER PUBLICATIONS

"MSA G1 SCBA With Motorola Bluetooth Technology," available at https://www.fireapparatusmagazine.com/articles/company-news/2015/11/msa-g1-with-bluetooth-communications.html, Nov. 2015, 1 page.

Team Speak, "Your Team. Your Rules," retrieved May 2019 from https://www.teamspeak.com/en/, 5 pages.

John B. Tippett, Jr., "Creating Effective Fireground Communication," Firerescue, Issue 8, vol. 9, Aug. 1, 2014, pp. 1-5.

\* cited by examiner

COMMUNICATIONS SYSTEM HAVING MOBILE WIRELESS COMMUNICATIONS DEVICES OPERATIVE IN PUSH-TO-TALK MODE WORKGROUP AND HANDS-FREE MODE WORK SUBGROUPS AND ASSOCIATED METHODS

FIELD OF THE INVENTION

The present invention relates to communications systems, and, more particularly, to operating mobile wireless communications devices in push-to-talk and hands-free modes and related methods.

BACKGROUND OF THE INVENTION

Emergency personnel and first responders, such as firefighters, may be organized into separate teams that communicate among each other using mobile wireless communications devices operative in a Land Mobile Radio (LMR) communications system. For example, an active firefighting scene may include a group of firefighters that are organized into different teams, each team preforming a selected function and each team having between two to four team members. One firefighting team may work ladders for entry into tall buildings, another firefighting team may be involved in rescue operations, and yet another firefighting team involved in search efforts.

During an emergency response, an incident commander may be responsible for assigning the firefighters to different teams based on the needs at the time and skill levels of individual firefighters. Sometimes the assignments of individual team members or groups of team members to a specific group or team may be changed over time during the emergency to allow one or more team members to rest, or to have a team member from one team assist another more active team. The incident commander could assign one team member that is a member of the ladder team, which may not be busy at the time, to a search team that requires additional team members to help search in a smoky and hazardous terrain or building. These work assignments are often made by the incident commander either in person or via Land Mobile Radio (LMR) mobile wireless communications devices carried by each team member, in this case, by each firefighter. These work assignments are tracked by the incident commander.

While actively working their team assignments, first responders, such as firefighters, often face challenging conditions, for example, limited or zero visibility among team members, and use their mobile wireless communications devices to communicate among each other, typically via the LMR communications channel. Often, one member of a team will contact a member of the same team via the LMR channel, but all other team members in the other teams will hear that information that may be relevant only to the interests of a particular team. As a result, one member of a team may tie up the LMR communications channel that is active among all the different teams. For example, each firefighter typically carries a mobile wireless communications device operative using a separate push-to-talk switch, which may be operatively connected to a combination microphone/speaker carried at or near their Self-Contained Breathing Apparatus (SCBA) mask. A firefighter may press his push-to-talk button and speak through his mask into the microphone. The mask may significantly inhibit person-to-person voice communications within a team. Also, many team members may be busy when responding to an emergency and the hands of the team members are often occupied when performing typical job tasks as in a fire. If a short message is to be given to another team member within that team, the firefighter would have to free one of his hands and engage the mobile device by pushing the button in their push-to-talk device to talk to his fellow team member, who may be only four or five feet away. This short instruction to the team member who is in close proximity may impact all members in other teams since all members of the other teams would hear that common transmission over the LMR communications channel and possibly distract members of other teams.

In an effort to lessen this confusion, first responders, such as firefighters, sometimes have each team member in their respective team communicate to each other by getting in close proximity to each other and then speaking through their SCBA mask, or using hand signals. Close proximity communications between team members in one team may be difficult in high noise emergency situations when each team member has SCBA masks and associated equipment, for example. Hand signals are not always feasible in low-visibility environments. These options may be difficult in some harsh emergency situations and as a result, team members may resort to using the Land Mobile Radio system as noted before, thus affecting members in all teams. The LMR channel is valuable, and information transmitted over the LMR channel intended for one team may not be pertinent to other teams.

Some SCBA equipment includes integrated microphones that capture audio inside the mask and broadcast local voice communications from an external wired or wireless speaker. These communications systems may be disadvantaged by limited sound pressure levels from external speakers, and specifically wireless speakers, and thus, exhibit limited effective range for extending person-to-person communications between team members. Some current off-the-shelf (COTS) approaches provide hands-free communication using headsets and bridged Voice over IP (VoIP) teleconference capabilities. That approach, however, may require a separate portable communications device to be carried by a firefighter that is separate from their mobile wireless communications device.

SUMMARY OF THE INVENTION

In general, a communications system may include a command communications device and a plurality of mobile wireless communications devices responsive to the command communications device to be assigned into a push-to-talk mode workgroup and with subsets of the plurality of mobile wireless communications devices also to be assigned to respective different hands-free mode work subgroups. Each mobile wireless communications device may include a portable housing, at least one wireless transceiver carried by the portable housing operable in the push-to-talk mode and the hands-free mode, and a controller carried by the portable housing, coupled to the at least one wireless transceiver, and responsive to the command communications device to operate in the assigned push-to-talk mode workgroup and the assigned hands-free mode work subgroup.

The at least one wireless transceiver may comprise a WiFi transceiver, and the hands-free mode may be operable over the WiFi transceiver. The given mobile communications device of a given hands-free mode workgroup may operate as a WiFi access point. The at least one wireless transceiver may comprise a P25 transceiver, and the push-to-talk mode may be operable over the P25 transceiver.

In one embodiment, the controller is configured to reduce an audio level of the hands-free mode when receiving a push-to-talk mode transmission. The mobile wireless communications device may comprise an accessory device coupled to the controller. The accessory device may include a wireless audio input/output device. The controller of a given mobile wireless communications device may be configured to send a unique identification to the command communications device.

Another aspect is directed to a method of operating a communications system that may include operating a command communications device to assign a plurality of mobile wireless communications devices into a push-to-talk mode workgroup and to assign subsets of the plurality of mobile wireless communications devices to respective different hands-free mode work subgroups, and operating a controller of each mobile wireless communications device to operate in the assigned push-to-talk mode workgroup and the assigned hands-free mode work subgroup.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete. Like numbers refer to like elements throughout.

Figure 1:
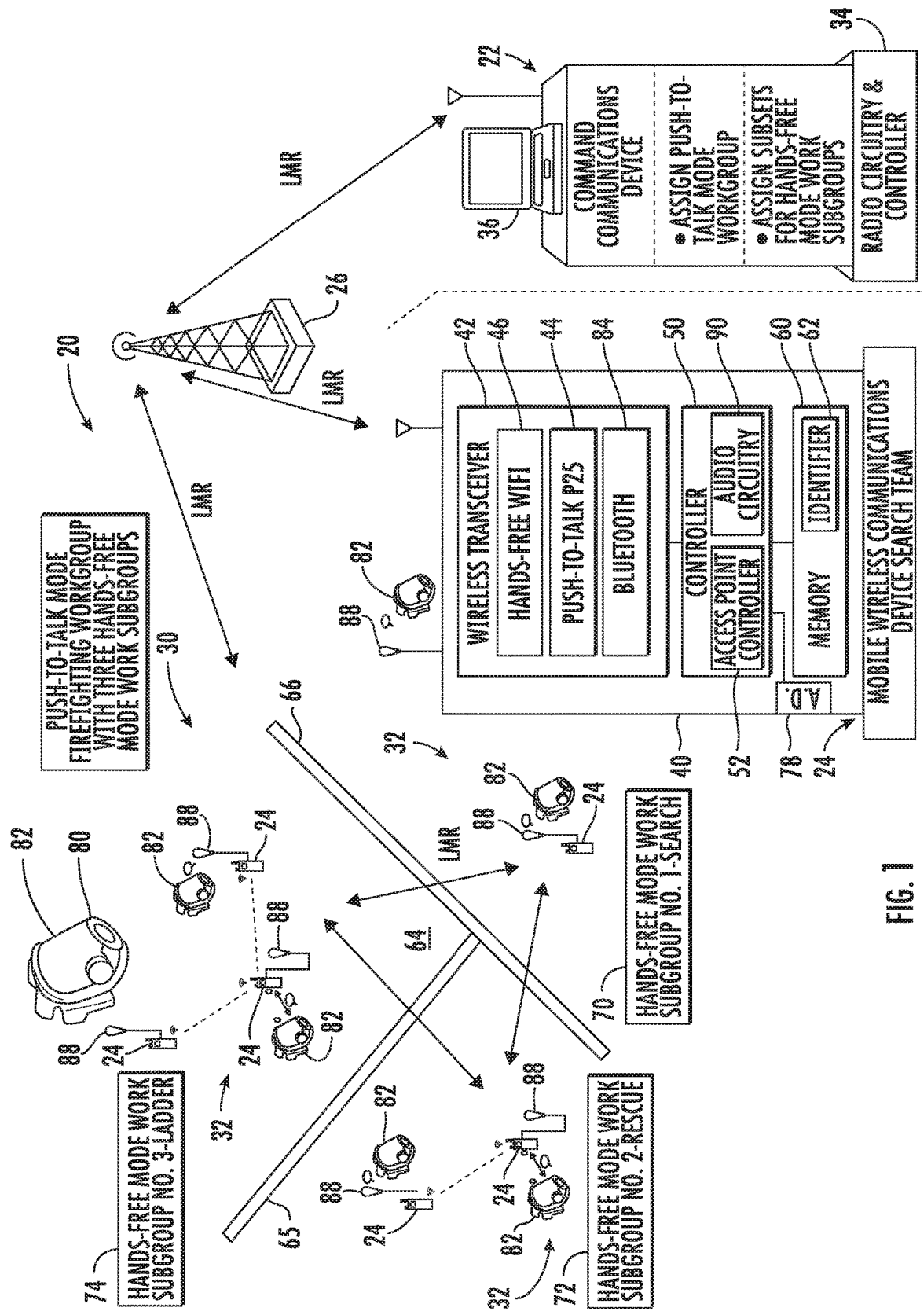
FIG. 1 is a general environmental view of the communications system showing a command communications device and plurality of mobile wireless communications devices operative in a push-to-talk mode workgroup and hands-free mode work subgroup.

Referring initially to FIG. 1, a communications system is illustrated generally at 20 and includes a command communications device indicated generally at 22. A plurality of mobile wireless communications devices 24 are responsive to the command communications device 22 to be assigned into a push-to-talk mode workgroup indicated generally at 30 and with subsets of the plurality of mobile wireless communications devices also to be assigned to respective different hands-free mode work subgroups each illustrated generally at 32. The command communications device 22 includes radio transceiver and controller circuitry 34 that communicate with the mobile wireless communications device 24 and issue commands. The command communications device 22 may also include a user terminal 36 where an incident commander may enter commands and program mobile wireless communications devices 22.

In an example, a large group of firefighters may be responding to an emergency and each firefighter carries a mobile wireless communications device 22. The entire group of firefighters may be grouped in a push-to-talk mode firefighting workgroup 30 and all mobile wireless communications devices 24 may communicate with the command communications device 22 operated by the incident commander using a Land Mobile Radio (LMR) communications system in a person-to-person voice communications channel using the push-to-talk functionality of the mobile wireless communications devices 24. An example LMR communications system includes a Project 25 suite of standards for digital mobile radio communications designed for use by public safety organizations in North America, and commonly referred to as a P25 system. The LMR communications system may include repeater stations 26 or other transmission stations or towers commonly used in such LMR communications systems. A mobile wireless communications device 24 is assigned to each first responder, such as a firefighter, and may be configured to send a unique identification to the command communications device 22.

A large block diagram of a mobile wireless communications device 24 is illustrated in FIG. 1 to show component parts and functions. Each mobile wireless communications device 24 includes a portable housing 40 as represented by the box outline for illustration purposes only. At least one wireless transceiver 42 is carried by the portable housing 40 and includes an LMR transceiver, in this non-limiting example, a P25 transceiver 44, operable in the push-to-talk mode, and a WiFi transceiver 46, operable in the hands-free mode. A controller 50 is carried by the portable housing 40 and coupled to the at least one wireless transceiver 42 and responsive to the command communications device 22 to operate in an assigned push-to-talk mode workgroup 30 and an assigned hands-free mode work subgroup 32. Each mobile wireless communications device 24 can also operate as a WiFi access point using an access point controller circuit 52, such that each member in a team or subgroup can communicate wirelessly using the WiFi communications protocol with other team members via each WiFi transceiver 46 contained in a mobile wireless communications device.

The incident commander located at the command communications device 26 may configure each team to allow one of its team members to be a team leader, and that team leader may be assigned as the WiFi access point for the other team members within that one hands-free mode work subgroup. Each respective mobile wireless communications device 24 carried by a team member may be configured to send a unique identification to the command communications device 22 to allow the incident commander to make assignments of individual team members to respective teams as hands-free mode work subgroups 32 and change team members among different subgroups when necessary, for example, when other teams may need an additional team member to deal with a specific task or accomplish their goals. Each mobile wireless communications device 24 includes a memory 60 storing a unique identification 62 as an identifier of the device.

The incident commander can make assignments by configuring messages via the LMR channel from the command communications device 22 and transmitting configuration messages to individual mobile wireless communications devices 24. For example, as illustrated, three hands-free mode work subgroups 32 as three separate teams are illustrated working in a building 64 having transverse wall sections 65, 66, with Team 1 indicated at 70 corresponding to a search subgroup with two members each having their own mobile wireless communications devices 24, and Team 2 illustrated at 72, corresponding to a rescue subgroup with two team members each having respective mobile wireless communications devices, and Team 3 illustrated at 74 as a ladder subgroup for handling any ladders for entering the building 64, for example, and having three team members, each with a mobile wireless communications device. If the Team 1 search subgroup 70 with two team members requires a third team member, then the incident commander at the command communications device 22 may issue a command that is transmitted as a configuration message to a selected team member of the Team 3 ladder subgroup 74 and may configure the mobile wireless communications device 24 of that team member from Team 3 to operate in a hands-free mode work subgroup 32 over WiFi with team members of the Team 1 search subgroup.

Each mobile wireless communications device 24 includes an accessory device 78, such as a wireless audio input/output device coupled to the controller 50. The accessory device may be coupled with a wireless audio input/output device 80 as a microphone and speaker contained within a Self-Contained Breathing Apparatus (SCBA) mask 82 and worn by each team member of each hands-free mode work subgroup 32, and communicating via Bluetooth using the Bluetooth circuit 84 in each mobile wireless communications device 24 to the microphone/speaker 80 in the mask. An enlarged view of a SCBA mask 82 is shown in the Team 3 ladder subgroup 74 and showing the general location of the microphone/speaker 80. In another example, the wireless microphone/speaker 80 could be located on the firefighter protective clothing near the lapel or upper chest so that the firefighter or other first responder could speak through the mask, and the microphone would pick up the voice. Separate speakers could be used.

To initiate a push-to-talk mode, each mobile wireless communications device 24 may include a separate push-to-talk microphone/speaker accessory 88 that could be wired in this example to the respective mobile wireless communications device 24. The push-to-talk microphone/speaker accessory 88 could be attached on the protective clothing worn by the firefighter near the shoulder or breast, and in this example, the firefighter pushes the button on the push-to-talk microphone/speaker accessory 88 and opens a channel on the land mobile radio (LMR) communications system and is able to communicate with all mobile wireless communications devices 24 and with the incident commander at the command communications device 22.

A team member in the Team 1 search subgroup 70 could be on a search mission in an area of the building 64 on fire that has not yet been searched by other team members. That one team member could see a floor that will soon collapse, causing catastrophic damage to the building 64. That team member may make an emergency call using the push-to-talk microphone/speaker accessory 88 on the LMR channel to all team members in the push-to-talk mode workgroup 30, requesting all team members to get out of the building immediately. By pressing the button on the push-to-talk microphone/speaker accessory 88, the LMR channel is open and the search team member can make the respective emergency communication to everyone in the entire workgroup 30. The incident commander using the command communications device 22 could respond with instructions to team members in different subgroups since the incident commander should know where each specific team is generally located in the building 64. Audio circuitry 90 is included within each mobile wireless communications device 24 and operates with the controller 50 and configured to reduce or mute the audio level in the hands-free mode when receiving a push-to-talk mode transmission from another team member, another subgroup, or incident commander.

An example mobile wireless communications device 24 is a Harris Corporation XL-200P, multi-band LTE mobile radio that may have push-to-talk capability using the P25 transceiver 44 and able to transfer data and voice over a land mobile radio (LMR) channel. It may include a phase II modulation protocol allowing audio and data to pass through a compressed bit stream and provide two TDMA voice channels in the same RF bandwidth, e.g., 12.5 KHz. This example of the mobile wireless communications device 24 may operate on VHF, UHF and 700/800 MHz frequencies and is both Verizon certified and Band-14 ready. It has single, dual or all band operation. It may also include LTE-enabled applications, such as video streaming and biometric sensing for user monitoring and includes GPS, Bluetooth WiFi capability via the Bluetooth circuit 84 and hands-free WiFi transceiver 46. It includes audio circuitry 90 for the active noise cancellation, allowing the controller 50 to reduce an audio level of the hands-free mode when receiving a push-to-talk mode transmission. The WiFi audio can be set to a minimum or completely phased out when receiving a push-to-talk mode transmission.

The mobile wireless communications device 24, as an example Harris Corporation XL-200P device, may meet various Mil Spec standards and adapt different encryption for communications, including single-key AES (Advanced Encryption Standard). It may include a four-position A-B-C-D switch and programmable switches, so that one of the switches can be programmed and allow the mobile wireless communications device 24 to be switched into a hands-free mode work subgroup 32, in addition to receiving a command from the command communications device 22 to operate in such mode. Also, a programmable switch could allow one of the team members to have their mobile wireless communications device 24 operate as a WiFi access point via the access point controller circuit 52. This configuration as a WiFi access point can also occur by a command from the command communications device 22.

Figure 2:
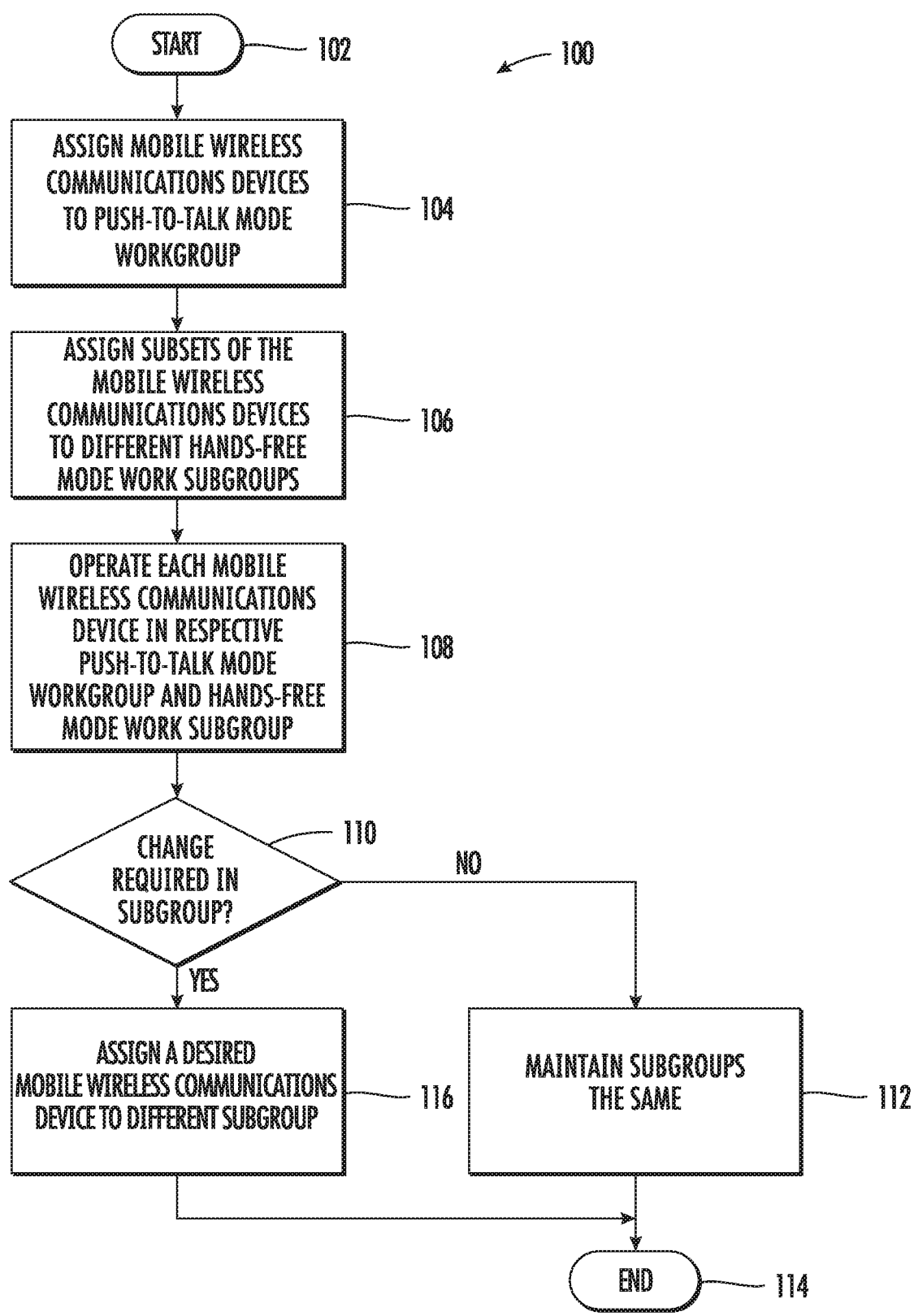
FIG. 2 is a high-level flowchart of a method for operating the communications system of FIG. 1.

Referring now to FIG. 2, there is illustrated a flowchart for showing a sequence of steps that may be used for operating the communications system 20 as illustrated in FIG. 1, with the method indicated generally at 100. The process starts (Block 102) and the command communications device 22 assigns a plurality of mobile wireless communications devices 24 used by respective first responders, such as firefighters, into a push-to-talk mode workgroup (Block 104). Based upon training or job categories for the first responders, e.g., firefighters, and perhaps the training associated with those best adapted for specific tasks, the command communications device 22 may assign subsets of a plurality of mobile wireless communications devices 24 to respective different hands-free mode work subgroups 32 (Block 106). The controller 50 at each mobile wireless communications device 24 operates its respective device in its assigned push-to-talk mode workgroup 30 and the assigned hands-free mode work subgroup 32 (Block 108). The command communications device 22 may periodically determine if the needs of each team is being met and determine if there should be a change in the number of team members for a specific hands-free mode work subgroup 32, and whether a team member should be switched from one subgroup to another subgroup (Block 110). If no change is required, the subgroups maintain the same respective team members and no changes are made (Block 112). The process ends (Block 114).

If a change in the subgroup is required, the command communications device 22 will transmit a command to a specific mobile wireless communications device 24 based upon a unique identification 62 of that given mobile wireless communications device stored in its memory 60, and assign that mobile wireless communications device into a different hands-free mode work subgroup 32 (Block 116). For example, a member of the Team 3 ladder team 74 may be assigned to the Team 1 search team 70, since the incident commander at the command communications device 22 has determined that the search team requires more help. At this time, the process ends (Block 114).

Figure 3:
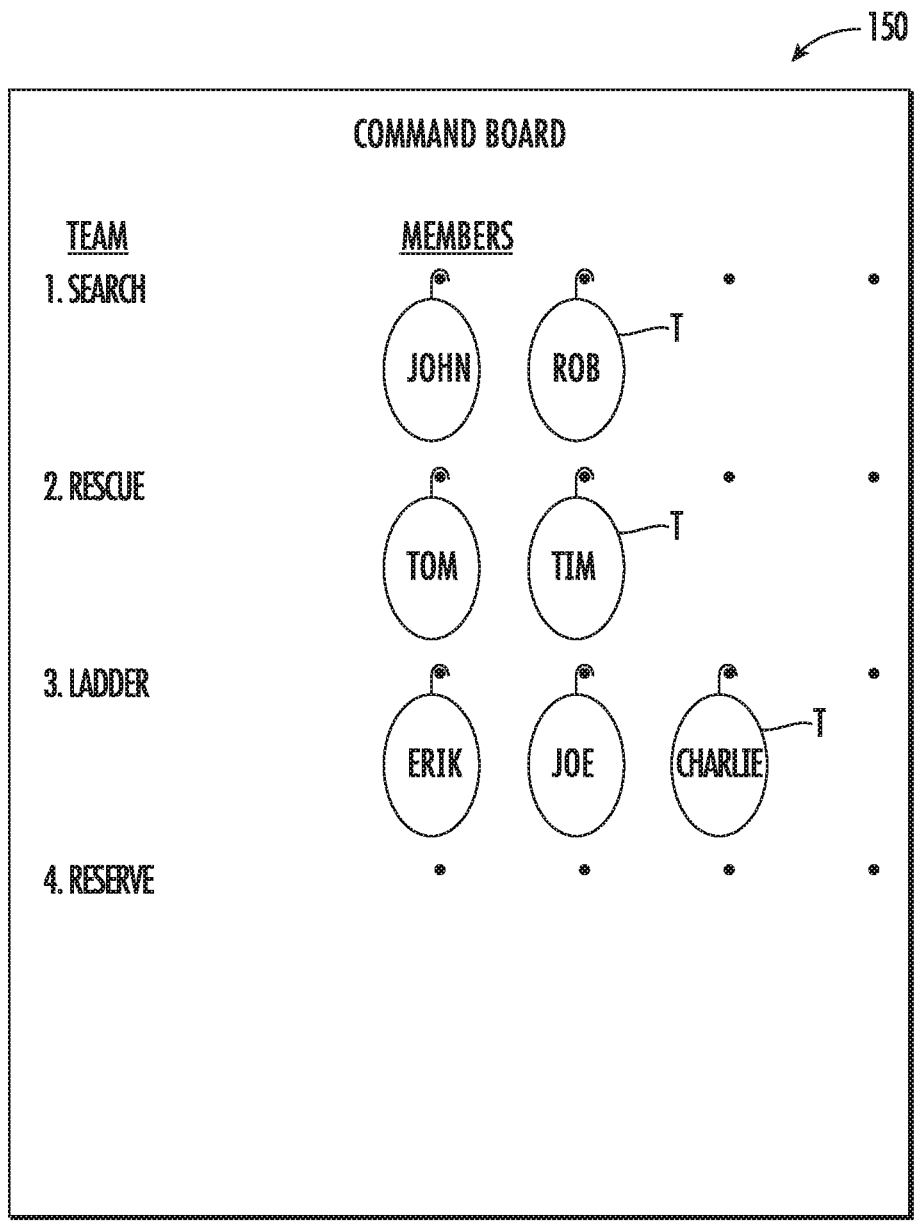
FIG. 3 is a diagrammatic view of a Command Board operative to assign mobile wireless communications devices to hands-free mode work subgroups.

It is possible that the mobile wireless communications devices 24 could be organized into different hands-free mode work subgroups 32 using tags or other identifiers placed on an electronic or manual Command Board as shown illustratively at 150 in the schematic diagram of the Command Board in FIG. 3. The Command Board 150 could be located at the command communications device 22 and include a number of rows with each row corresponding to a specific hands-free work subgroup 32, such as the Team 3 ladder subgroup 74, Team 2 rescue subgroup 72, and Team 1 search subgroup 70. Each team member has a specific tag (T) with the team member's name on it and associated with the respective mobile wireless communications device 22 and its unique identification 62. Each tag (T) may be formed as an RFID tag, as an example. When a tag (T) for a specific team member is moved between one team and another team on the Command Board 150, the assignment to a respective hands-free mode work subgroup 32 is made automatically, with the respective mobile wireless communications device 24 receiving a command automatically from the command communications device 22 and switching WiFi communications to the respective hands-free mode work subgroup 32 to which the mobile wireless communications device 24 now belongs.

Although the examples as illustrated in FIGS. 1-3 are explained relative to first responders as firefighters, the system 20 may be extended to SWAT, HAZMAT, or other special operations groups operating within the LMR/ICOM user community. Various commercial uses are also envisioned. Additional encryption may be possible with an extension of the footprint. Voice over IP 802.11 standard library waveforms and PJSIP standard library waveforms may be used in support for 1:N bridging of audio calls.

It should be understood that the wireless transceiver 42 may be a hands-free WiFi transceiver 46 and a push-to-talk P25 44 transceiver, but the wireless transceiver can be configured to work with additional commercial off-the-shelf (COTS) waveforms or other proprietary waveforms. The use of proprietary waveforms could be used for additional security.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications system comprising:
   a command communications device; and
   a plurality of mobile wireless communications devices responsive to the command communications device to be assigned into a push-to-talk mode workgroup and with subsets of the plurality of mobile wireless communications devices also to be assigned to respective different hands-free mode work subgroups;
   each mobile wireless communications device comprising
   a portable housing,
   at least one wireless transceiver carried by the portable housing operable in the push-to-talk mode and the hands-free mode, and
   a controller carried by the portable housing, coupled to the at least one wireless transceiver, and responsive to the command communications device to operate in the assigned push-to-talk mode workgroup and the assigned hands-free mode work subgroup.

2. The communications system of claim 1 wherein the at least one wireless transceiver comprises a WiFi transceiver; and wherein the hands-free mode is operable over the WiFi transceiver.

3. The communications system of claim 2 wherein a given mobile communications device of a given hands-free mode workgroup operates as a WiFi access point.

4. The communications system of claim 1 wherein the at least one wireless transceiver comprises a P25 transceiver; and wherein the push-to-talk mode is operable over the P25 transceiver.

5. The communications system of claim 1 wherein the controller is configured to reduce an audio level of the hands-free mode when receiving a push-to-talk mode transmission.

6. The communications system of claim 1 wherein each mobile wireless communications device comprises an accessory device coupled to the controller.

7. The communications system of claim 6 wherein the accessory device comprises a wireless audio input/output device.

8. The communications system of claim 1 wherein the controller of a given mobile wireless communications device is configured to send a unique identification to the command communications device.

9. A communications system comprising:
   a plurality of mobile wireless communications devices responsive to a command communications device to be assigned into a push-to-talk mode workgroup and with subsets of the plurality of mobile wireless communications devices also to be assigned to respective different hands-free mode work subgroups;
   each mobile wireless communications device comprising
   a portable housing,
   at least one wireless transceiver carried by the portable housing operable in the push-to-talk mode and the hands-free mode, and
   a controller carried by the portable housing, coupled to the at least one wireless transceiver, and responsive to the command communications device to operate in the assigned push-to-talk mode workgroup and the assigned hands-free mode work subgroup.

10. The communications system of claim 9 wherein the at least one wireless transceiver comprises a WiFi transceiver; and wherein the hands-free mode is operable over the WiFi transceiver.

11. The communications system of claim 10 wherein a given mobile communications device of a given hands-free mode workgroup operates as a WiFi access point.

12. The communications system of claim 9 wherein the at least one wireless transceiver comprises a P25 transceiver; and wherein the push-to-talk mode is operable over the P25 transceiver.

13. The communications system of claim 9 wherein the controller is configured to reduce an audio level of the hands-free mode when receiving a push-to-talk mode transmission.

14. The communications system of claim 9 wherein each mobile wireless communications device comprises an accessory device coupled to the controller.

15. The communications system of claim 14 wherein the accessory device comprises a wireless audio input/output device.

16. The communications system of claim 9 wherein the controller of a given mobile wireless communications device is configured to send a unique identification to the command communications device.

17. A method of operating a communications system comprising:

operating a command communications device to assign a plurality of mobile wireless communications devices into a push-to-talk mode workgroup and to assign subsets of the plurality of mobile wireless communications devices to respective different hands-free mode work subgroups; and operating a controller of each mobile wireless communications device to operate in the assigned push-to-talk mode workgroup and the assigned hands-free mode work subgroup.

18. The method of claim 17 wherein the hands-free mode is operable over the WiFi transceiver.

19. The method of claim 18 wherein a given mobile communications device of a given hands-free mode workgroup operates as a WiFi access point.

20. The method of claim 17 wherein the push-to-talk mode is operable over the P25 transceiver.

21. The method of claim 17 comprising operating the controller to reduce an audio level of the hands-free mode when receiving a push-to-talk mode transmission.

22. The method of claim 17 comprising operating the controller of a given mobile wireless communications device to send a unique identification to the command communications device.

* * * * *